(No Model.)
G. R. PARKER.
PITMAN FENDER FOR HARVESTERS.
No. 249,980. Patented Nov. 22, 1881.
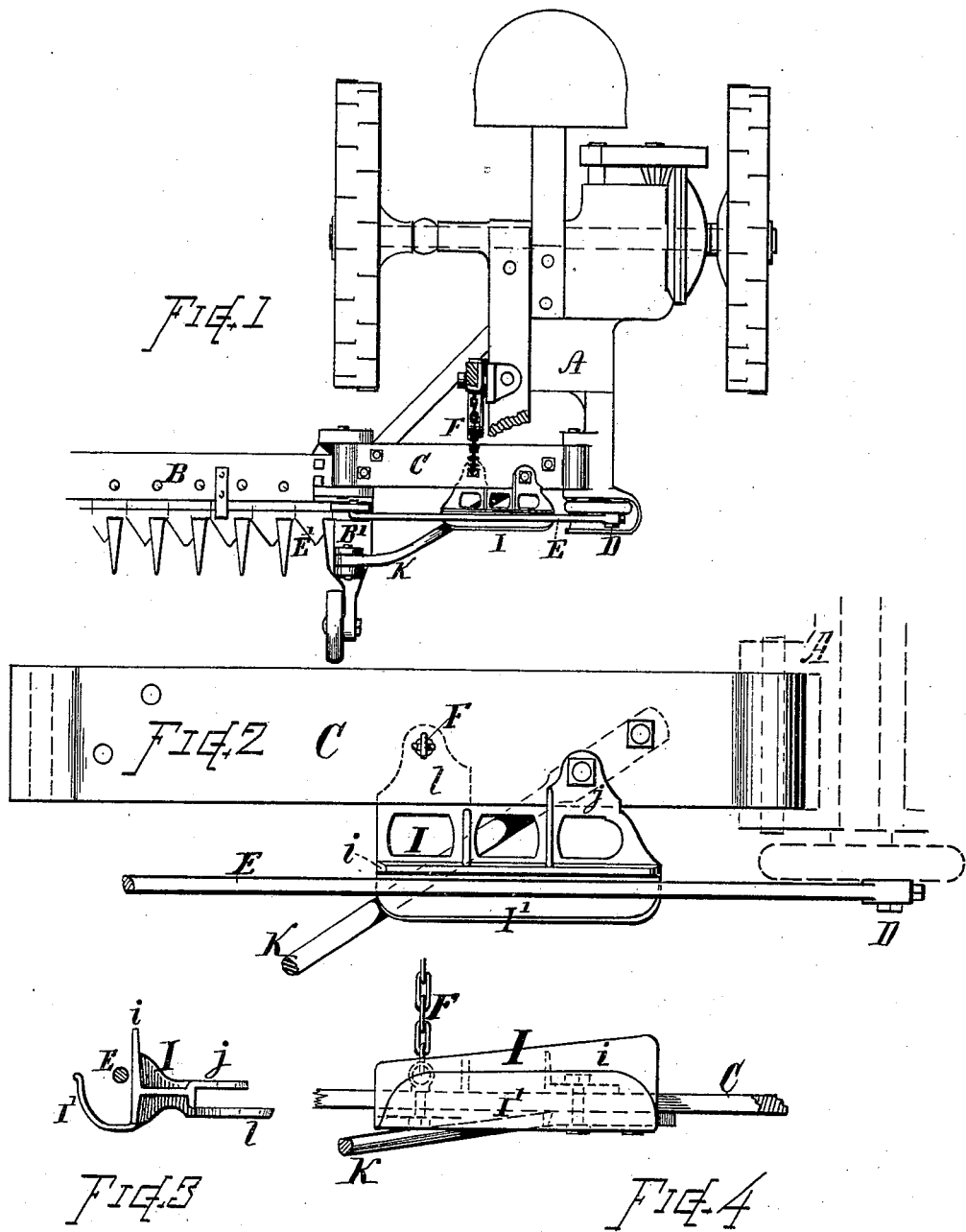
Witnesses
Geo. M. Rice 2d
S. R. Barton
Inventor
Gardner R. Parker
by Chas. H. Burleigh
Atty.

United States Patent Office.

GARDNER R. PARKER, OF WORCESTER, MASSACHUSETTS, ASSIGNOR TO THE RICHARDSON MANUFACTURING COMPANY, OF SAME PLACE.

PITMAN-FENDER FOR HARVESTERS.

SPECIFICATION forming part of Letters Patent No. 249,980, dated November 22, 1881.

Application filed August 29, 1881. (No model.)

*To all whom it may concern:*

Be it known that I, GARDNER R. PARKER, of Worcester, in the county of Worcester and State of Massachusetts, have invented certain new and useful Improvements in Pitman-Fenders for Harvesters; and I declare the following to be a description of my said invention, sufficiently full, clear, and exact to enable others skilled in the art to which it appertains to make and use the same, reference being had to the accompanying drawings, which form a part of this specification.

The object of this invention is to provide a simple and efficient guard or fender for protecting the pitman in mowing and reaping machines against injury by contact with any obstruction over or against which the machine may be run, said fender being adapted for use in connection with a wrought-iron frame or joint-bar, and conveniently detachable therefrom. These objects I attain by the mechanism illustrated in the accompanying drawings, and hereinafter described.

Figure 1 is a plan view of such parts of a harvesting-machine as will illustrate the nature of my invention. Fig. 2 is a plan view of the hinge-joint bar and pitman-fender on a larger scale. Fig. 3 is an end view of the pitman-fender, and Fig. 4 is a front view of the same, with dotted lines indicating the manner of attachment.

A denotes the frame of the machine; B, the finger-bar; C, the hinge-joint bar, made from wrought metal and having its ends respectively hinged to the frame A and finger-bar B or its shoe B'. D indicates the crank; E, the pitman; E', the cutter, and F the elevating lever and chain, all of which parts may be constructed and arranged in the ordinary manner.

I indicates my improved fender, which is cast from malleable iron, so as to be light and strong. The forward part of the fender is made as a flat plate, $i$, which stands in vertical position directly back of the pitman-rod and as near thereto as the parts can conveniently run without striking each other. The rear part of the fender is formed to have a bearing against the forward edge of the hinge-joint bar C, and is provided with ears $j\ l$, through which the attaching-bolts are arranged. In the present instance the fender is secured to the bar C by the same bolts as the elevating-chain F and the forward brace, K, of the finger-bar shoe B', thus obviating the necessity of extra bolts. The fender I occupies a position on the front of the bar C adjacent to its junction with the brace K, and at such position as to protect the pitman from being bent or injured by contact with any obstruction which might be deflected by or escape contact with said brace K, or over or against which the machine may be run.

The forward part of the fender may be made with a projecting lip or flange, I', along its lower edge, which lip extends forward and upward beneath the pitman, in the manner shown, so that the front will have a tendency to ride up onto or over any obstruction with which it is brought into contact. This forward-projecting lip may be modified in shape, or may be omitted, if desired, since the vertical part or forward plate will serve the purpose fairly well, and prevent the bending of the pitman by stroke or shock from the front.

By constructing and arranging the fender in the manner shown and described I am enabled to produce an efficient fender at a moderate cost, one also adapted for use with a wrought metal joint bar or frame, and one which can, in case of injury, be readily removed and replaced without trouble and at comparatively little expense. This fender can also readily be applied to machines now in use, or such of them as are made with hinge-joint bars similar to that shown.

What I claim as of my invention, and desire to secure by Letters Patent, is—

1. The pitman-fender I, cast from malleable iron, with its forward part provided with a flat plate, $i$, adapted to stand in vertical position directly in rear of the pitman, and its rear part formed to have a bearing against the edge of the frame or hinge-joint bar, and provided with ears $j\ l$ for attachment thereto, in the manner substantially as hereinbefore set forth.

2. The combination, with the wrought-iron joint-bar or frame-piece C and pitman E, of the independent fender-piece I, formed from malleable iron, and attached to the front of said joint-bar adjacent to its junction with the brace K, with its front plate, $i$, located in vertical position close in rear of said pitman, substantially as and for the purpose set forth.

Witness my hand this 25th day of August, A. D. 1881.

GARDNER R. PARKER.

Witnesses:
  CHAS. H. BURLEIGH,
  EDWIN P. CURTIS.